(12) United States Patent
Collet et al.

(10) Patent No.: US 9,741,065 B2
(45) Date of Patent: Aug. 22, 2017

(54) AUTOMATED GUIDANCE FOR SELECTING COMPONENTS OF AN IT SOLUTION

(71) Applicant: International Business Machines Corporation, Armonk, NY (US)

(72) Inventors: Denis L. Collet, Tivoli, NY (US); Jerald R. Eaker, Pittsboro, NC (US); Guillermo Martinez, Round Rock, TX (US); Jay L. Tabor, Cullman, AL (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 1136 days.

(21) Appl. No.: 13/893,410

(22) Filed: May 14, 2013

(65) Prior Publication Data

US 2014/0344101 A1    Nov. 20, 2014

(51) Int. Cl.
*G06Q 30/00* (2012.01)
*G06Q 30/06* (2012.01)

(52) U.S. Cl.
CPC ................. *G06Q 30/0631* (2013.01)

(58) Field of Classification Search
CPC . G06Q 30/0631; G06F 8/437; H04M 15/7655
USPC ........................................................ 705/26.7
See application file for complete search history.

(56) References Cited

U.S. PATENT DOCUMENTS

| | | | | |
|---|---|---|---|---|
| 7,945,531 B2* | 5/2011 | Mullender | ............ | G06F 9/4443 707/625 |
| 2003/0061404 A1* | 3/2003 | Atwal | ................... | G06Q 30/02 719/328 |
| 2005/0108022 A1* | 5/2005 | Bhattacharya | ... | G06Q 10/06375 705/7.37 |
| 2009/0037875 A1* | 2/2009 | Jones | ........................ | G06F 8/34 717/109 |
| 2009/0158237 A1 | 6/2009 | Zhang et al. | | |

(Continued)

OTHER PUBLICATIONS

IBM, "Method of creating a componentized architecture for unifying resource sharing scenarios in Cloud Computing environment", IP.com PriorArtDatabase, IPCOM000193146D, Feb. 11, 2010, Copyright IP.com, pp. 1-13, <http://priorartdatabase.com/IPCOM/000193146>.

(Continued)

*Primary Examiner* — Yogesh C Garg
*Assistant Examiner* — Lalith Duraisamygurusamy
(74) *Attorney, Agent, or Firm* — Anthony Canale; Andrew M. Calderon; Roberts Mlotkowski Safran Cole & Calderon, P.C.

(57) ABSTRACT

A computer displays a first set of components available for selection by the customer for an IT solution. The computer receives, from the customer, selection of a first component included in the first set of components. The computer determines that subsequent use of the first component requires a service. The computer identifies and displays a second set of components based on compatibility with the first component and ability to use the same service as the first component. The computer receives selection, from the customer, a second component included in the second set of components. The computer designs the IT solution to (a) include the first component and the second component and (b) share the same service during use of the first component and the second component.

20 Claims, 3 Drawing Sheets

(56) References Cited

U.S. PATENT DOCUMENTS

| | | | | |
|---|---|---|---|---|
| 2009/0274434 A1* | 11/2009 | Mei | ................... | G06K 9/00711 |
| | | | | 386/278 |
| 2010/0250300 A1 | 9/2010 | Antoun et al. | | |
| 2011/0035287 A1* | 2/2011 | Fox | ....................... | G06Q 30/02 |
| | | | | 705/14.69 |
| 2011/0313882 A1* | 12/2011 | Barthes | ............. | G06Q 30/0607 |
| | | | | 705/26.25 |
| 2012/0210292 A1 | 8/2012 | Zhang et al. | | |
| 2012/0240129 A1* | 9/2012 | Kanso | .................... | G06F 9/505 |
| | | | | 718/105 |

OTHER PUBLICATIONS

IBM, "Method and System for Selecting Architectural and Design Patterns Based on Service Qualities", IP.com PriorArtDatabase, IPCOM000192689D, Jan. 28, 2010, Copyright IP.com, pp. 1-5, <http://priorartdatabase.com/IPCOM/000192689>.

IBM, "Rational Software Architect Design Manager", <http://www-01.ibm.com/software/rational/products/swarchitect/design-manager/>.

* cited by examiner

AUTOMATED GUIDANCE FOR SELECTING COMPONENTS OF AN IT SOLUTION

FIELD OF INVENTION

The present invention relates generally to computer-assisted selection of hardware and software components of a computer system, and more specifically to providing computerized guidance during the process of selecting hardware and software components for an information technology solution.

BACKGROUND OF THE INVENTION

An information technology ("IT") solution is a combination of hardware, software, and services used to solve an IT problem. However, given the large number of hardware, software, and service components that are typically available, choosing an optimum combination of components can be difficult. For example, a client needs to set up a computer system to handle the IT problem of resolving website issues. IT personnel working for the client spend two weeks determining the best approach to solving the problem, the specific needs the IT solution must satisfy, and choosing the best components to combine to form the IT solution. The final IT solution is a combination of hardware, software, and services configured for resolving website issues.

Typically, as a client grows and changes, IT solutions used by the client must be upgraded. However, the large number of possible components can quickly make it difficult for a client, such as an organization, to customize an IT solution in a timely and cost effective manner. Therefore, to satisfy the needs of clients, a number of approaches have been developed to solve IT problems and provide the needed IT solutions.

To solve an IT problem, three common approaches are often employed. The first approach is for a client, such as a business, to choose an IT solution from a selection of known IT solutions. The use of known IT solutions can be very limiting as the requirements for an IT solution often vary from one client to the next. Also, such solutions may not be scalable or customizable to meet the future needs of the client.

The second approach to solve an IT problem is for the client to utilize internal IT personnel to develop a customized IT solution, which can be very time consuming. Further, the associated cost of employing the needed skilled IT personnel to create a customized IT solution can put such an approach well out of reach. The third approach is for a client to hire a second party to design a customized IT solution, which can be very costly.

The creation of an IT solution is often difficult regardless of the approach used. If a known IT solution is to be used, then that IT solution must be created before hand. The creation of an IT solution typically requires an in-depth knowledge of a multitude of possible components. Generally, those who create IT solutions use their knowledge to carefully select and combine components to create an IT solution. This is a time consuming, and often costly, process that must be repeated to solve each individual IT problem.

To be considered complete, most IT solutions have requirements that must be met. An IT solution is often considered complete when the IT solution includes all of the components required to solve a given IT problem, which requires the IT solution to function. For example, if a computer did not include a processor, then that computer would not be considered a complete IT solution because the computer would not be able to function.

Known web sites allow a customer to select components according to the type of components required to complete an IT solution. For example, a customer initiates the creation of a custom order for a computer. The customer is presented with groups of components that are organized by type, e.g., processors, memory, motherboards, etc. The customer first selects a specific processor from the group of available processors. Following a similar process, the customer then selects the size of memory, the type of operating system, and the applications, etc., of the computer. The web sites can also make selections on behalf of the customer to assist in the completion of an IT solution. For example, the customer selects a specific processor and then uses an automatic selection option, provided by the web site, to select a compatible motherboard and chipset for that processor. The known web site software controls the hardware and software which is offered to the customer based on compatibility between the components themselves. For example, a Microsoft™ Windows™ 7 operating system requires a minimum amount of memory, so if the user selects the Windows™ operating system, then the web site software requires the user to select at least the minimum amount of memory. Likewise, certain applications can execute on certain releases of the Windows™ operating systems, but not earlier releases, so once the user selects the Windows 7 operating system, the web site software will only offer compatible applications to the user. As another example, some applications can only utilize certain data bases, so once the user selects the application, the automated system limits the choice of data bases based on compatibility with the application that was selected.

The knowledge needed to create an IT solution includes several categories of information such as, for example, program compatibility. Given the rapid development and growth of the software industry, the number of possible components that can be used to create IT solutions is rapidly increasing, which can increase the difficulty of creating IT solutions based on the compatibility of selected components.

An object of the invention is to consider factors other than compatibility between the components themselves in selecting components for an IT solution.

SUMMARY

Embodiments of the present invention provide a system, method, and program product to model the architecture of information technology ("IT") solutions. A computer displays a first set of components available for selection by the customer for the IT solution. The computer receives selection from the customer of one of the first set of components for the IT solution. The computer determines that subsequent use of the one component of the first set requires a service, and identifies a second set of components based on compatibility with the one component and ability to use the same service as the one component, and displays the second set of components to the customer. The computer receives selection from the customer of one of the second set of components for inclusion in the IT solution. The computer designs the IT solution to (a) include the one component from the first set and the one component from the second set and (b) share the same service during use of the one component from the first set and the one component from the second set.

DETAILED DESCRIPTION

Embodiments of the present invention will now be described in detail with reference to the accompanying drawings.

Figure 1:
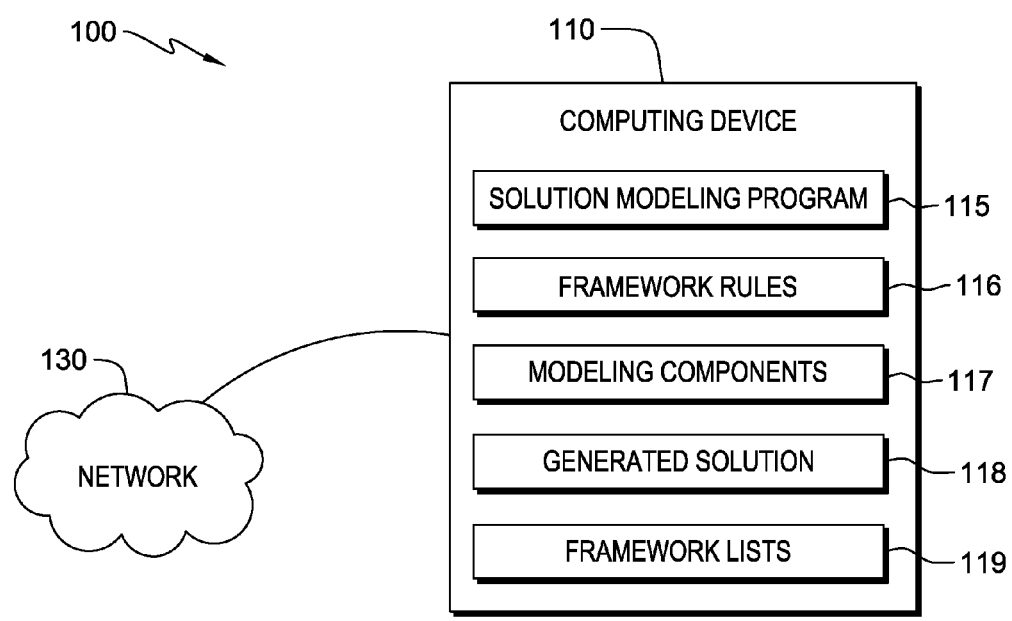
FIG. 1 is a block diagram of an architecture modeling system, in accordance with an embodiment of the present invention.

FIG. 1 is a block diagram illustrating architecture modeling system 100 in accordance with one embodiment of the present invention. Architecture modeling system 100 includes computing device 110, which includes solution modeling program 115, framework rules 116, modeling components 117, generated solution 118, and framework lists 119.

In this exemplary embodiment, solution modeling program 115, framework rules 116, modeling components 117, generated solution 118, and framework lists 119 are located on computing device 110. However, in other embodiments, solution modeling program 115, framework rules 116, modeling components 117, generated solution 118, and framework lists 119 may be stored externally and accessed through network 130. Network 130 may be, for example, a local area network (LAN), a wide area network (WAN) such as the Internet, or a combination of the two, and may include wired, wireless, fiber optic or any other connection known in the art. In general, network 130 may be any combination of connections and protocols that will support communications between solution modeling program 115, framework rules 116, modeling components 117, generated solution 118, and framework lists 119, and computing device 110 in accordance with a desired embodiment of the present invention.

In various embodiments of the present invention, computing device 110 may be a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to solution modeling program 115, framework rules 116, modeling components 117, generated solution 118, and framework lists 119, and that is capable of running solution modeling program 115. Computing device 110 may include internal hardware components 800 and external hardware components 900 as depicted and described in further detail with respect to FIG. 3.

In an exemplary embodiment, solution modeling program 115 accesses the information included in framework lists 119, modeling components 117 and framework rules 116 during the generation of an IT solution. To begin the process of creating an IT solution, solution modeling program 115 generates an unpopulated framework using the information included in framework lists 119. Solution modeling program 115 then uses the component information included in modeling components 117 in combination with the rules included in framework rules 116 to determine which components to present to a user for selection. In accordance with the present invention, many of the rules are based on commonality of services applicable to different components of the IT solution. For example, the user selects a first component and there is a service such as help desk expertise that is provided for the first component. Many of the services described herein fall under one of three generalized activity categories; specifically, configuration management, event management, and business management activities.

In an exemplary embodiment, configuration management (CM) is herein defined as a type of service activity that establishes and maintains consistency of a component's performance, functional and physical attributes with its requirements, design and operational information during the life cycle of the component, e.g., services to change software configurations in response to hardware upgrades. Event management is herein defined as a type of service activity that organizes, coordinates, and responds to events and activities that occur during the life cycle of a component, e.g., program crashes and scheduled program updates. A service category that is related to event management, in so far as both services respond to events, is business management. Business management is herein defined as a type of service activity that responds to needs of a client or the client's customers that use a given IT component, e.g., advertisement services, a call center for a business, or an IT support hotline for users. Typically, business management services function to support the activities of the users of a given IT component, whereas both configuration and event management focus more on the IT component itself.

In an exemplary embodiment, in the case where a service is included with the selected component, solution modeling program 115 will prevent the user from selecting a second component that includes a different service because of the additional expense of the different service, where there is an alternate component to the second component that can use the same service as the first component. In an alternate embodiment of the present invention, the program 115 does not exclude the second components that uses a different service, but advises the user of the additional cost of the different service that is required.

The tables included in modeling components 117, described in more detail below, illustrates a list of components and their associated compatibilities and the services that are used for each of the components. A human previously entered the data for the tables included in modeling components 117. After the user selects each component from a list displayed by program 115, the program 115 queries the tables included in modeling components 117 to determine which other components in the same functional category are compatible and use the same service. Next, the program 115 presents only the other compatible components in the same functional category that share the same service, or optionally presents the other compatible components in the same functional category that use a different service but with an advisory of the additional service cost. Solution modeling program 115 then uses the information included in modeling components 117 and framework rules 116 to identify the selected components to be included in the IT solution and arrange them in a framework, which is initially unpopulated.

As additional components are selected by the user and added to the unpopulated framework, the resulting populated framework is saved as part of generated solution 118. After an IT solution has been assembled, by adding components to the unpopulated framework, solution modeling program 115 renders the populated framework as an assembled IT solution by replacing the components with images and illustrating the connectivity between the images.

Solution modeling program 115 saves the rendered IT solution as part of generated solution 118. In some embodiments, solution modeling program 115 uses selected components to populate a list of components that will be included in the IT solution. Such a list of components can also include other information relating to one or more attributes of the components included in the list, such as, for example, an estimated cost or an estimated time period needed to implement the IT solution based on the list of components.

In an exemplary embodiment, framework rules 116 includes a set of rules that govern a list of possible IT components, such as the components included in modeling components 117. Framework rules 116 further includes rules governing both the availability of components for selection and the placement of selected components within a populated framework, such as a populated framework included in generated solution 118. The rules included in framework rules 116 are used by solution modeling program 115 to filter, sort, and present a list of possible component options during the generation of an IT solution. Solution modeling program 115 also uses the rules included in framework rules 116 in combination with the information included in framework lists 119 to generate unpopulated frameworks, which can then be populated with components.

In an exemplary embodiment, many of the rules included in framework rules 116 govern the availability of components for selection, which is based on service related attributes associated with a given component, non-service related attributes of the components, and the selection of various components for inclusion in the framework. The first filtering process, performed by solution modeling program 115, is based on the services associated with a given selected component. Some rules require the inclusion of a type of service in an IT solution, while others require that a certain type of service not be included in an IT solution. There are two main types of service related rules used for service based filtering.

The first type of service related rules limit selection of other components based on the inclusion of a service for a given component. For example, a user selects from a first set of available components, component X which requires an IT expertise service such as help desk expertise, configuration management expertise, or event management. Next, solution modeling program 115 identifies another set of available components that are compatible with component X and use the same IT expertise service so that the same IT expertise service can be shared by the different components during usage of the IT solution. ("Compatibility" depends on functional interoperability such as which operating system is required by an application to execute, or how much memory the operating system requires, or whether two programs can communicate with each other to cooperate.) While some service related rules are very specific as to the inclusion of a single specific service, e.g., customer help desk service with an event manager to handle customer related issues, other service related rules only specify the inclusion of a type of service. For example, a user selects component Y which includes a customer help desk service with an event manager service. Solution modeling program 115 identifies that component X includes a call center for resolution of customer problems. Since the service included with component X performs same basic function as the services included with component Y, solution modeling program 115 prevents selection of component X.

The second type of service related rules limit selection of other components based on the requirement of inclusion of a service by given component. For example, a user selects first component, which includes a requirement for an email management service. Solution modeling program 115 filters the possible components to remove those components which do not include the required email management service. The user then selects a second component that includes the email management service required by the first component. In another example, a user selects component S, which includes a requirement for an advertising management service which manages the amount of advertising sent and which audience receives those advertisements. Solution modeling program 115 filters the possible components to remove those components which do not include a service that is equivalent to, i.e., is of the same type as, the required advertising management service. The user then selects a second component T that includes a service, e.g., a public relations service that sends positive promotional messages to potential customers, that is equivalent service required by the first component. After solution modeling program 115 filters the available components using service related rules, then solution modeling program 115 filters the available components using non-service related rules, i.e., rules that are not based on the service related attributes of the components.

In certain embodiments, framework rules 116 includes rules that specify the inclusion or exclusion of a service, or a type of service, based on the area of IT that includes the IT problem to be solved (for further details regarding areas of IT, see the discussion of framework lists 119). For example, if the IT problem originates in the area of customer service, then a service, for a component, that addresses employee data management may not be very useful. As a result, only those components with services that are beneficial to solving the IT problem are presented as selectable options.

In an exemplary embodiment, the rules included in framework rules 116 govern the assembly and availability of components using non-service related rules, which are based on the non-service related attributes of the components and the selection of various components. For example, a user wants to create an IT solution to solve an email distribution problem. The user selects the type of email platform, which is a component that is already used by his or her company. Based on the selection of the type of email platform, the non-service related rules included in framework rules 116 are used by solution modeling program 115 to filter the possible components and generate a list of compatible components that is then presented to the user, which prevents the selection of components that are incompatible with that type of email platform. Therefore, components that can only be used for, for example, dropped telephone calls would not be available for selection. However, the rules would allow the user to select other components that are compatible with the email platform used by his or her company. The selected components are added to an unpopulated framework based on the specification of the rules and the component attributes. The now populated framework is saved as part of generated solution 118.

In an exemplary embodiment, modeling components 117 includes tables that organize possible components based on service related attributes; specifically the services provided for, or required by, the various components. For example, column A includes a list of the possible components and columns B-D include specific services included by the various components, e.g., column B is for a help desk service, column C is for an IT support service, and column D is for a data backup service. Columns E, F and G list other services which are the equivalent of respective columns B-D. Solution modeling program 115 accesses the service based tables when solution modeling program 115 filters possible components using service related rules.

Modeling components 117 also includes tables that organize possible components by non-service related attributes. Many components include numerous non-service related attributes. As such modeling components 117 includes many non-service related tables, which are accessed by solution modeling program 115 when solution modeling program 115 filters possible components using non-service related rules.

Typically, a component is added to the tables of possible components by a user with a detailed knowledge of that component. The user adds a given component to the tables of possible IT components and associates the services and other attributes of the component to the various entries for that component. Solution modeling program 115 then makes the added component available for filtering operations and possible selection. In an alternative embodiment, solution modeling program 115 can identify new components and determine the respective attributes of the new components. Solution modeling program 115 then adds the component to the various tables and associates the respective services and attributes with the new component entries. The now updated table is included as part of modeling components 117.

In an exemplary embodiment, the non-service related attributes associated with a component, included in modeling components 117, often include a variety of information. For example, the attributes of an email component includes the name of the email component, a requirement for internet access, and a requirement for an internet web browser to facilitate internet access. Further, the non-service related attributes of a component can include information such as the inclusion or exclusion of the component in a group, the rendering order of the component, and the position the component will take in a rendering space, e.g., in a framework or in a rendered IT solution. For example, the component is a data storage device to be included in an IT solution for data distribution. The data storage device belongs to the group "memory" and has a rendering order indicating that the data storage device should be rendered first. Continuing the example, in one embodiment the inclusion in the group "memory" also indicates that the data storage device is to be rendered in a lower right quadrant of a rendered IT solution. Therefore, the storage device would be rendered first and would be rendered in the lower right quadrant of a rendered IT solution.

In an exemplary embodiment, certain components can have non-service related attributes that are populated by another component's attributes, e.g., parent-child attributes. In other words, the attributes associated with a component, included in modeling components 117 can also include an attribute of a parent or child another component, i.e., a parent or child component. For example, the attribute of a parent of a given component indicates that the rendered parent component be located in an upper left quadrant of a rendered solution. The attribute of the child component indicates that the child component is to be rendered to the left of its parent component. As a result, the child component will be rendered to the left of the parent component in the upper left quadrant of the rendered solution.

Another non-service related attribute of a component can be a pre-requisite for inclusion in a framework. For example, a monitor component can not be included in a framework without the inclusion of a power supply component. Further, compatibility or incompatibility of the component with another component is a commonly used non-service related attribute that is often used to determine whether a component is available for selection. For example, after initial filtering of components using service related rules, a list of possible software components, components A-D, is generated. Using the non-service related tables included in modeling components 117, solution modeling program 115 identifies that software A component is compatible with software B component. However, software A component is incompatible with software C component and software D component. If a user selects software A component to be included in an IT solution, then software C component and software D component will not be made available as selectable components due to their incompatibility with software A component. Conversely, software B component will be made available as a component choice because software B component is compatible with software A component.

In an exemplary embodiment, the non-service related attributes associated with a component, included in modeling components 117, can also include other information such as a message linked with the component, a cost associated with the component, a time period associated with the component, a link from the component to another component, and an image linked to the component. For example, a first component has a link to a second component. As such, selection of the first component automatically includes the selection of the second component. In another example, there is a limited budget to be used to create an IT solution for a given IT problem. As a result of the limited budget, the cost of each selected component further limits the selection of ensuing components based on the additional cost associated with each additional component. In yet another example, a component has an associated message, time period, and image as respective attributes. After selecting the component, a user is presented with a message that includes an image and a time period. The time period included in the message indicates that the software license for the component will expire on a specific date, and the image is a warning symbol indicating that the software license will not be renewed. As a result of the message, the user does not select that component for inclusion in the IT solution.

In an exemplary embodiment, generated solution 118 includes populated frameworks and rendered IT solutions that are produced by solution modeling program 115. A populated framework includes all of the components that connect the starting point of the IT solution to the end point of the IT solution. As components are selected, solution modeling program 115 adds the selected components to a framework, included in framework lists 119, to create a populated framework. A populated framework is saved as part of generated solution 118.

In an exemplary embodiment, solution modeling program 115 accesses the information included in generated solution 118 as needed to update and save changes made to populated frameworks and rendered IT solutions. The populated frameworks included in generated solution 118 take the form of a selection tree. The framework itself is illustrated using nodes to represent a given component, and lines connecting the nodes to illustrate the interactions between various components. For example, a line connects a node representing a telephone operator to a node representing a telephone. In some embodiments a node represents a component menu.

In other words, as selections are made in one component menu, other component menus or component sub-menus, herein referred to as branches, are displayed allowing further component selections to be made. As selections are made for the inclusion of various components, new branches of the selection tree are added and removed by solution modeling program 115, e.g., the other component menus or component sub-menus are added and removed. The branches can include sorting and filtering options regarding respective attributes of components included in the branch. For example, a software component is needed that has the attribute of costing less than $500. The user selects a filter for software attributes and selects "cost", "less than", and "$500". A branch is then presented to the user showing software components that cost less than $500.

In an exemplary embodiment, framework lists 119 includes a list of starting points and end points for the creation of an IT solution. In some embodiments, framework lists 119 includes previously generated unpopulated frameworks. An unpopulated framework is created by the selection of an area of IT that includes the IT problem. For example, problems with clients would fall under the area of customer service. In another example, loss of internet access would fall under the area of communications. The selection of an area of IT indicates a starting point from which an initial component selection can be made. The end point of an empty framework follows a similar line of logic. A type of solution can be specified by selection of an end point which further defines the framework rules to be applied when creating an IT solution. For example, continuing with the above example of losing internet access, an end point is selected that indicates that internet access is created for three servers that service fifteen thousand users. The framework rules to be applied would be selected, by solution modeling program 115, based on both the indicated start and end points.

To generate a populated framework, solution modeling program 115 accesses the lists of respective start starting points and end points included in framework lists 119. Based on respective the selected start and end points, solution modeling program 115 generates an unpopulated framework. Further, based on the selected start point and end points, solution modeling program 115 generates an initial list of components, using the information included in framework rules 116 and modeling components 117, from which a user chooses. Solution modeling program 115 adds the selected components to the empty framework thereby creating a populated framework, which is then saved as part of generated solution 118.

Figure 2:
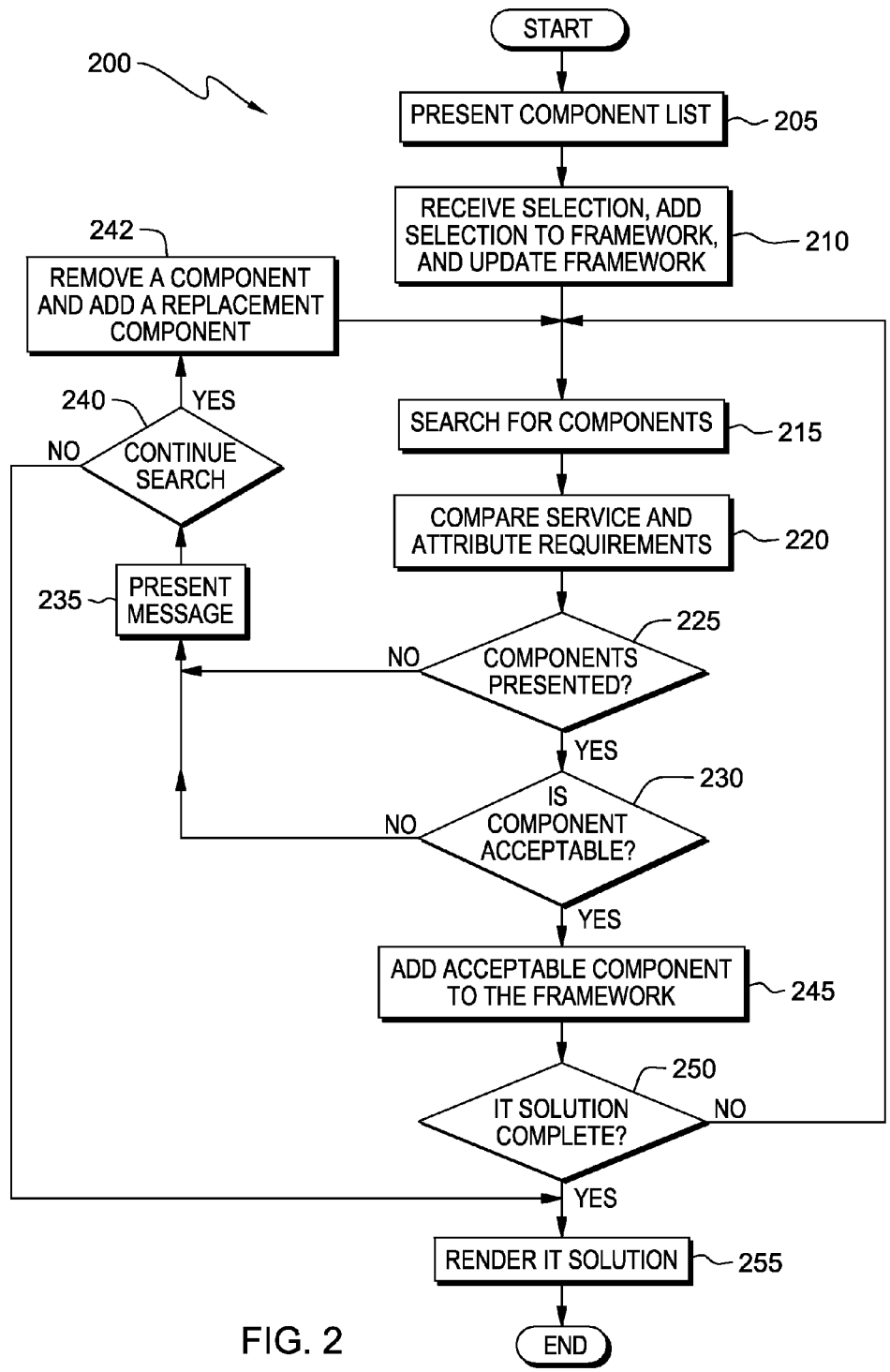
FIG. 2 is a flowchart illustrating the steps of a solution modeling program of FIG. 1, in accordance with an embodiment of the present invention.

FIG. 2 is a flowchart illustrating the function of solution modeling program 115, executing on computing device 110, for the generation of an IT solution during an architecture modeling session, in an exemplary embodiment.

In this exemplary embodiment, in step 205, solution modeling program 115 presents a list of possible IT components to a user during an architecture modeling session. The list of possible IT components is generated based on the selected area of IT, which includes the IT problem to be solved. A copy of an unpopulated framework is generated and saved as part of generated solution 118 based, at least in part, on the indicated area of IT. For example, if an IT problem includes issues with customer complaints, then the user would indicate customer service as the area of IT. Solution modeling program 115 then generates a copy of an unpopulated framework for customer service problems and presents, to the user, a list of possible IT components that address customer service IT problems. In one embodiment, the framework does not contain strict guidelines or component patterns for which types of components to use. Rather, the framework only includes a start point, such as a customer, an end point, such as a solution for the customer, and a space between for the addition of other components that will connect the start point to the end point. In other words, using a tree for an analogy, the start point is the trunk of the tree and the end point is the leaf of the tree. The space in between the trunk and the leaf needs to be connected by branches, i.e., the components that are added to the framework. In most instances, there are multiple branch pathways, i.e., combinations of components that will reach the leaf. In certain embodiments, multiple areas of IT can be combined to form a hybrid unpopulated framework with multiple start and end points which are connected through a more complex system of branches.

In step 210, of this exemplary embodiment, solution modeling program 115 receives a user selection of a first component included in the list of possible IT components. Solution modeling program 115 adds the first component to the framework according to the rules included in framework rules 116 and the attributes of the components included in modeling components 117. The framework organizes the first component based, at least in part, on one or more attributes associated with the list of possible IT components. For example, if an IT solution will address an IT problem for email management then the framework will organize the first component according to component attributes and framework rules relating to email management.

As components, such as the first component selected in step 210, are selected and added to the framework, the solution modeling program 115 adds or removes additional slots, or nodes, for components to the framework based on the attributes of the previously added components. The addition of multiple identical components can, in this embodiment, be accomplished using a number to indicate the quantity of identical components. For example a framework for customer service problems organizes the components according to their overall function. If the user selects a customer service representative as a component in step 210, then solution modeling program 115 would add the customer service representative to a part of the framework that includes a slot where a customer service representative can be added. In response to the selection of more than one customer service representative, solution modeling program 115 modifies the framework according to the framework rules, included in framework rules 116, to include an additional slot where the number of customer service representative(s) will be indicated as well as slots for components that can support the function of one or more customer service representative(s) e.g., a telephone call center and a data management system. As components are added and removed from the framework, solution modeling program 115 updates the copy of the framework included in generated solution 118 accordingly.

In this exemplary embodiment, in step 215, solution modeling program 115 searches for additional components that can be added to the framework based on the components which have already been added to the framework. Solution modeling program 115 uses the rules included in framework rules 116 and the services and attributes of the components included in modeling components 117 to determine the parameters to be used for the search. For example, based on the inclusion of a data management system component in the framework, solution modeling program 115 accesses the rules included in framework rules 116 and the attributes of the components included in modeling components 117 and determines that the search parameters should limit search results to only the types of components that are required by, or compatible with, the selected data management system. Using the defined search parameters solution modeling program 115 searches for computer terminal components for user interface with the data management system as well as components for data storage and data filing systems. Solution modeling program 115 then proceeds to step 220.

In this exemplary embodiment, in step 220, solution modeling program 115 accesses the rules included in framework rules 116 and the information included in modeling components 117 and compares the service and attribute requirements of the available components to the service and attribute requirements of the components which have already been added to the framework. If there is a match between the respective services and attributes, then solution modeling program 115 presents the matching, i.e., available, components to the user as selectable component options. If the service and attribute requirements of a given component do not match the service and attribute requirements of the components that have already been added to the framework, then that component is not presented to the user. For example, a first component included in the framework has a service related attribute which requires the inclusion of a service contract with a vendor. A second component identified during the search has an service related attribute which requires that there be no service contracts with vendors. As a result the second component is not presented to the user as a selectable component option. However, a third component identified during the search has attributes that do match the first component. Therefore, the third component is presented to the user as a selectable component option. Solution modeling program 115 then proceeds to decision step 225.

In decision step 225, solution modeling program 115 determines if any components were presented for selection. If components were presented for selection (decision step 225, yes branch), then solution modeling program 115 proceeds to decision step 230. If no components were presented for selection (decision step 225, no branch), then solution modeling program 115 proceeds to step 235.

In this exemplary embodiment, in step 235, solution modeling program 115 presents a message to the user indicating that there are no additional components available, i.e., no matching components were presented in step 220, and proceeds to decision step 240. Unless, a current component is removed, then solution modeling program 115 would be unable to proceed further in the generation of the IT solution. To address the aforementioned impasse, in decision step 240, solution modeling program 115 determines if the user has indicated that they wish to continue to search for additional components, e.g., a user selects an option to continue searching. If the user has indicated that they do not wish to continue to search for additional components (decision step 240, no branch), then solution modeling program 115 proceeds to step 255.

If the user wishes to continue searching for components (decision step 240, yes branch), then solution modeling program 115 proceeds to step 242. In step 242, solution modeling program 115 prompts the user to remove at least one component from the framework, or select a substitute component, or both, to allow different component options to become available. Once a substitute component has been selected, solution modeling program 115 adds the substitute component to the framework and returns to step 215. For example, a search resulted in the identification of ten components all of which have attributes that do not match the attributes of a first component in a framework. As a result, solution modeling program 115 presents a message to the user in step 235 indicating that there are no additional components available. In response, the user elects to continue searching in decision step 240. Then in step 242, the user removes the first component from the framework and adds a second component in place of the first component. The inclusion of the second component initiates a search for additional components in respective steps 215 and 220 that results in the identification of four component options that were not previously identified.

In decision step 230, of this exemplary embodiment, solution modeling program 115 determines if an available component is acceptable to a user. The acceptability of a component is indicated by a user selecting an available component or by selecting an option that indicates that none of the available components are acceptable. If there are no acceptable components (decision step 230, no branch), then solution modeling program 115 proceeds to step 235, and proceeds further as described above.

If an available component is acceptable, i.e., the user selects an available component (decision step 230, yes branch), then solution modeling program 115 adds the acceptable component to the framework in step 245. Solution modeling program 115 then proceeds to decision step 250. In decision step 250 solution modeling program 115 determines if the IT solution is complete for the IT problem. In some cases the completion of an IT solution is determined through the satisfaction of a set of parameters for a given type(s) of IT problem to be solved, which are included as part of framework rules 116. For example, a framework rule includes a set of parameters that requires a valid IT solution to connect the trunk of the tree to the leaf using at least three branches. In other words, the start point is connected to the end point using three different pathways. In other cases the user indicates that the solution is complete. If the IT solution is not complete (decision step 250, no branch), then solution modeling program 115 returns to step 215. If the IT solution is complete (decision step 250, yes branch), then solution modeling program 115 proceeds to step 255.

In step 255, solution modeling program 115 renders an image of the IT solution using the framework populated with the selected components. The rendered components are connected using lines to represent the relationships between the various selected components. Solution modeling program 115 also renders an architecture model based, at least in part, on the framework. The architecture model is rendered using images to represent the various selected components. The images are visually connected to indicate the relationships between the various selected components. The rendered framework and architecture model are presented to the user and saved as part of generated solution 118. For example, a mainframe computer image is rendered with images representing the software included on the mainframe computer. The software is shown as overlapping the mainframe computer image to indicate that the software is located on the mainframe computer. The mainframe also has a lines connecting to images of several computer terminals. In another example, only a partial IT solution is rendered because a user did not wish to continue searching for components. As a result, solution modeling program 115 uses empty box shapes used to represent the missing components and includes labels for the boxes indicating the type of component that is missing.

In some embodiments, solution modeling program 115 includes programming to identify the number of components or the types of components required to connect various start point(s) and end point(s) included in a framework. For example, a user wishes to use a minimum number of components and with the least overall cost to connect three start points to five end points. Solution modeling program 115 identifies several types of components that are needed to make the desired connections and generates a list of possible IT components for each type of component needed, from which the user selects. As the user makes a selection in a given list of possible IT components, the other lists of possible IT components are modified based on the attributes of the selected component and the attributes of the components included in the lists of possible IT components. Solution modeling program 115 adds the selected components to the framework, thereby forming an IT solution by connecting the starting point(s) to the end point(s).

In certain embodiments, solution modeling program 115 includes programming to make automatic selections of components based on predefined criteria. For example, if there is only one component available for selection, then solution modeling program 115 automatically selects and adds that component to the framework. In another example, based in part on availability, solution modeling program 115 uses automatic selection programming to automatically select components from a preferred vendor.

In some embodiments, automatic selection programming is used in conjunction with identification programming to generate an IT solution. Such a combination can reduce the amount of user selection required to generate an IT solution. For example, solution modeling program 115 uses the identification programming to identify the types of components required to connect the various start point(s) and end point(s) included in a framework. After generating a list of possible IT components for each required type of component, solution modeling program 115 uses the automatic selection programming to automatically add the cheapest available component from each list of possible IT components to the framework, thereby generating a cost effective IT solution.

Figure 3:
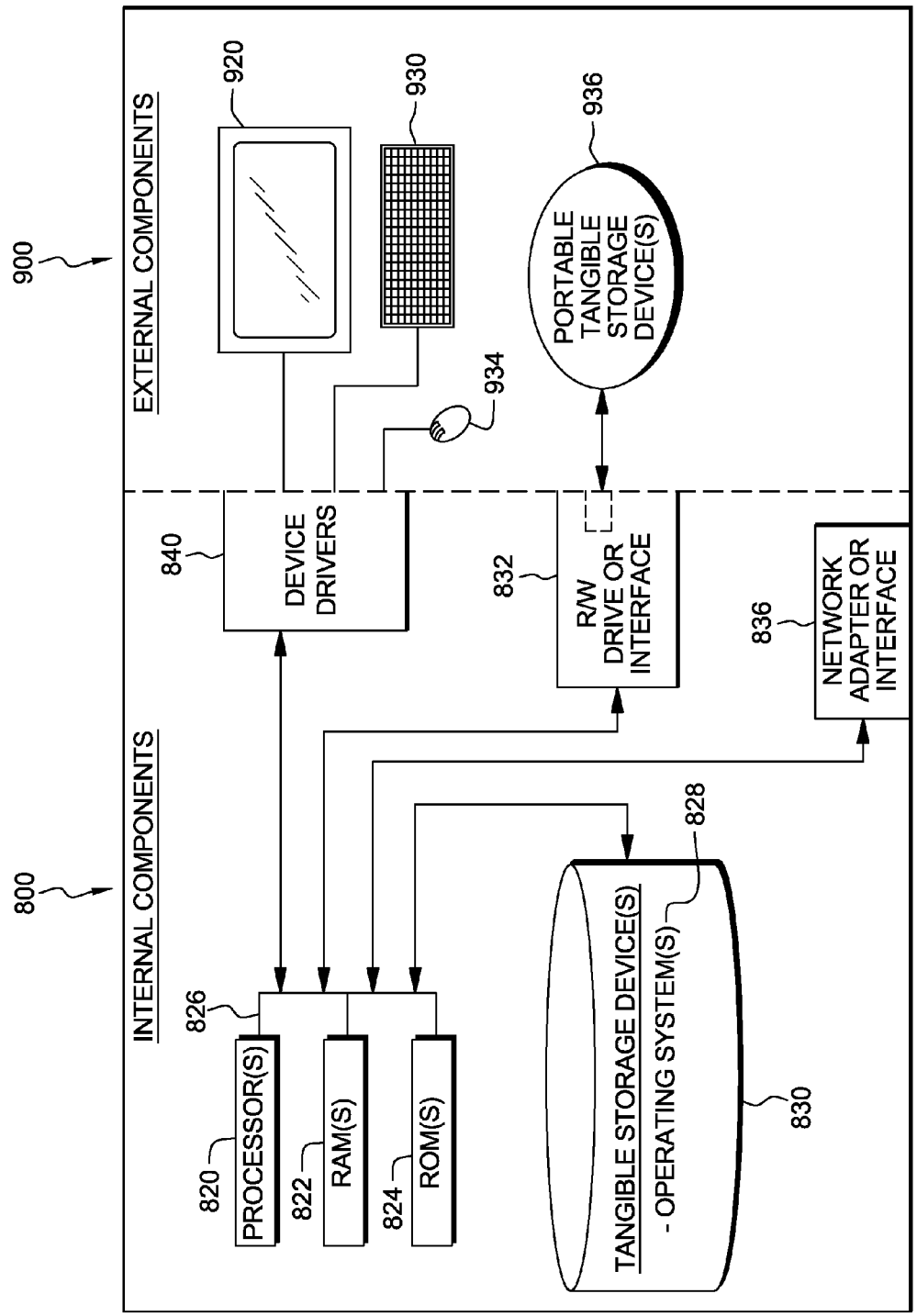
FIG. 3 is a block diagram of internal and external components within the computing device of FIG. 1 in accordance with an embodiment of the present invention.

Computing device 110 includes a set of internal components 800 and external components 900 illustrated in FIG. 3. Each set of internal components 800 includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and solution modeling program 115, framework rules 116, modeling components 117, generated solution 118, and framework lists 119 are stored on one or more of the respective computer-readable tangible storage devices 830 for execution or access by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store but does not transmit a computer program and digital information.

Each set of internal components 800 also includes a R/W drive or interface 832 to read from and write to one or more portable computer-readable tangible storage devices 936 that can store but do not transmit a computer program, such as a CD-ROM, DVD, memory stick, magnetic tape, magnetic disk, optical disk or semiconductor storage device. Solution modeling program 115, framework rules 116, modeling components 117, generated solution 118, and framework lists 119 can be stored on one or more of the respective portable computer-readable tangible storage devices 936, read via the respective R/W drive or interface 832 and loaded into the respective hard drive or semiconductor storage device 830.

Each set of internal components 800 also includes a network adapter or interface 836 such as a TCP/IP adapter card or wireless communication adapter (such as a 4G wireless communication adapter using OFDMA technology). Solution modeling program 115, framework rules 116, modeling components 117, and generated solution 118 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

Each of the sets of external components 900 includes a display screen 920, a keyboard or keypad 930, and a computer mouse or touchpad 934. Each of the sets of internal components 800 also includes device drivers 840 to interface to display screen 920 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

Based on the foregoing, a computer system, a method, and a program product have been disclosed for architecture modeling of IT solutions. However, numerous modifications and substitutions can be made without deviating from the scope of the present invention. Therefore, the present invention has been disclosed by way of example and not limitation.

What is claimed is:

1. A method for selecting components of an information technology ("IT") solution, the method comprising the steps of:
 a computer displaying a first set of components available for selection by a customer for creating an IT solution by having a solution modeling program generate an unpopulated framework using information included in a framework list and using rules included in framework rules in combination with modeling components to determine the first set of components to create the IT solution;
 the computer receiving selection from the customer of one of the first set of components for the IT solution;
 the computer determining that subsequent use of the one component of the first set requires a service wherein the service establishes and maintains consistency of the one component performance, functional and physical attributes of the one component, and design and operations information during a life cycle of the one component, and identifying a second set of components based on compatibility with the one component and ability to use the same service as the one component, rendering a populated framework by replacing the first set of components and the second set of components with images and illustrating a connectivity between the images wherein the populated framework connects a starting point of the IT solution to an end point of the IT solution, and displaying the second set of components to the customer;

the computer receiving selection from the customer of one of the second set of components for inclusion in the IT solution; and the computer designing the IT solution to (a) include the one component from the first set and the one component from the second set and (b) share the same service during use of the one component from the first set and the one component from the second set.

2. The method of claim 1, wherein the service includes one or more of event management, configuration management, and business management activities, and wherein the compatibility is based on functional interoperability including which operating system is required by an application to execute, how much memory the operating system requires, and whether two programs can communicate with each other to cooperate.

3. The method of claim 1, wherein the service required by the one component is at least one of a service that is provided for the component, a type of service that is required by the component, and a type of service that is provided for the component.

4. The method of claim 1, the method including the step of:

a computer rendering an architecture model based, at least in part, on the designed IT solution, wherein the architecture model uses a framework and images to represent respective components and services included in the designed IT solution, and wherein the architecture model is presented to the customer and saved as part of generated solution.

5. The method of claim 4, wherein an image of a component is visually connected to an image of a service based on a subsequent use of that service by the component.

6. The method of claim 1, the method including the steps of:

a computer determining a service provided for a third component; and the computer adding the determined service and the third component to a database.

7. The method of claim 1, the method including the steps of:

the computer generating a third set of components for inclusion in the IT solution;

the computer selecting one of the third set of components for inclusion in the IT solution; and the computer designing the IT solution to (a) include the one of the third set of components and (b) share a service between the one of the third set of components and one or both of the one component from the first set and the one component from the second set.

8. A computer program product for selecting components of an information technology ("IT") solution, the computer program product comprising:

one or more computer-readable storage media and program instructions stored on the one or more computer-readable storage media, the program instructions comprising:

program instructions to display a first set of components available for selection by a customer for creating the IT solution by having a solution modeling program generate an unpopulated framework using information included in a framework list and using rules included in framework rules in combination with modeling components to determine the first set of components to create the IT solution;

program instructions to receive selection from the customer of one of the first set of components for the IT solution;

program instructions to determine that subsequent use of the one component of the first set requires a service wherein the service establishes and maintains consistency of the one component performance, functional and physical attributes of the one component, and design and operations information during a life cycle of the one component, and identifying a second set of components based on compatibility with the one component and ability to use the same service as the one component, rendering a populated framework by replacing the first set of components and the second set of components with images and illustrating a connectivity between the images wherein the populated framework connects a starting point of the IT solution to an end point of the IT solution, and displaying the second set of components to the customer;

program instructions to receive selection from the customer of one of the second set of components for inclusion in the IT solution; and program instructions to design the IT solution to (a) include the one component from the first set and the one component from the second set and (b) share the same service during use of the one component from the first set and the one component from the second set.

9. The computer program product of claim 8, wherein the service includes one or more of event management, configuration management, and business management activities, and wherein the compatibility is based on functional interoperability including which operating system is required by an application to execute, how much memory the operating system requires, and whether two programs can communicate with each other to cooperate.

10. The computer program product of claim 8, wherein the service required by the one component is at least one of a service that is provided for the component, a type of service that is required by the component, and a type of service that is provided for the component.

11. The computer program product of claim 8, the program instructions including:

program instructions to render an architecture model based, at least in part, on the designed IT solution, wherein the architecture model uses a framework and images to represent respective components and services included in the designed IT solution, and wherein the architecture model are presented to the customer and saved as part of generated solution.

12. The computer program product of claim 11, wherein an image of a component is visually connected to an image of a service based on a subsequent use of that service by the component.

13. The computer program product of claim 8, the program instructions including:

program instructions to determine a service provided for a third component; and program instructions to add the determined service and the third component to a database.

14. The computer program product of claim 8, the program instructions including:

program instructions to generate a third set of components for inclusion in the IT solution; and program instructions to select one of the third set of components for inclusion in the IT solution; and program instructions to design the IT solution to (a) include the one of the third set of components and (b)

share a service between the one of the third set of components and one or both of the one component from the first set and the one component from the second set.

15. A computer system for selecting components of an information technology ("IT") solution, the computer system comprising:
    program instructions to display a first set of components available for selection by a customer for creating an IT solution by having a solution modeling program generate an unpopulated framework using information included in a framework list and using rules included in framework rules in combination with modeling components to determine the first set of components to create the IT solution;
    program instructions to receive selection from the customer of one of the first set of components for the IT solution;
    program instructions to determine that subsequent use of the one component of the first set requires a service wherein the service establishes and maintains consistency of the one component performance, functional and physical attributes of the one component, and design and operations information during a life cycle of the one component, and identifying a second set of components based on compatibility with the one component and ability to use the same service as the one component, rendering a populated framework by replacing the first set of components and the second set of components with images and illustrating a connectivity between the images wherein the populated framework connects a starting point of the IT solution to an end point of the IT solution, and displaying the second set of components to the customer;
    program instructions to receive selection from the customer of one of the second set of components for inclusion in the IT solution; and
    program instructions to design the IT solution to (a) include the one component from the first set and the one component from the second set and (b) share the same service during use of the one component from the first set and the one component from the second set.

16. The computer system of claim 15, wherein the service includes one or more of event management, configuration management, and business management activities.

17. The computer system of claim 15, wherein the service required by the one component is at least one of a service that is provided for the component, a type of service that is required by the component, and a type of service that is provided for the component.

18. The computer system of claim 15, the program instructions including:
    program instructions to render an architecture model based, at least in part, on the designed IT solution, wherein the architecture model uses a framework and images to represent respective components and services included in the designed IT solution, wherein an image of a component is visually connected to an image of a service based on a subsequent use of that service by that component, and wherein the architecture model are presented to the customer and saved as part of generated solution.

19. The computer system of claim 15, the program instructions including:
    program instructions to determine a service provided for a third component; and program instructions to add the determined service and the third component to a database.

20. The computer system of claim 15, the program instructions including:
    program instructions to generate a third set of components for inclusion in the IT solution; and
    program instructions to select one of the third set of components for inclusion in the IT solution; and
    program instructions to design the IT solution to (a) include the one of the third set of components and (b) share a service between the one of the third set of components and one or both of the one component from the first set and the one component from the second set.

* * * * *